May 9, 1933. A. D. POPE 1,908,443
BRAKE SHOE
Filed Aug. 14, 1931

INVENTOR:
ARTHUR D. POPE.

BY *[signature]*

ATTORNEY

Patented May 9, 1933

1,908,443

UNITED STATES PATENT OFFICE

ARTHUR D. POPE, OF OTTAWA, ONTARIO, CANADA, ASSIGNOR TO BENDIX BRAKE COMPANY, OF SOUTH BEND, INDIANA, A CORPORATION OF ILLINOIS

BRAKE SHOE

Application filed August 14, 1931. Serial No. 557,076.

This invention relates to shoes for brakes of the type in which a plurality of shoes are arranged to be moved outwardly into frictional engagement with a cylindrical drum.

The invention has for an object to provide a shoe of increased mechanical strength and of simple construction.

Another object is to provide a shoe having an increased heat-dissipating surface whereby risk of distortion is eliminated or reduced to negligible proportions.

The invention consists in the construction, combination and arrangement of parts hereinafter described and more particularly pointed out in the appended claims.

Referring now to the accompanying drawing, which illustrates, by way of example, a convenient embodiment of the invention with certain modifications thereof,—

Figure 1:
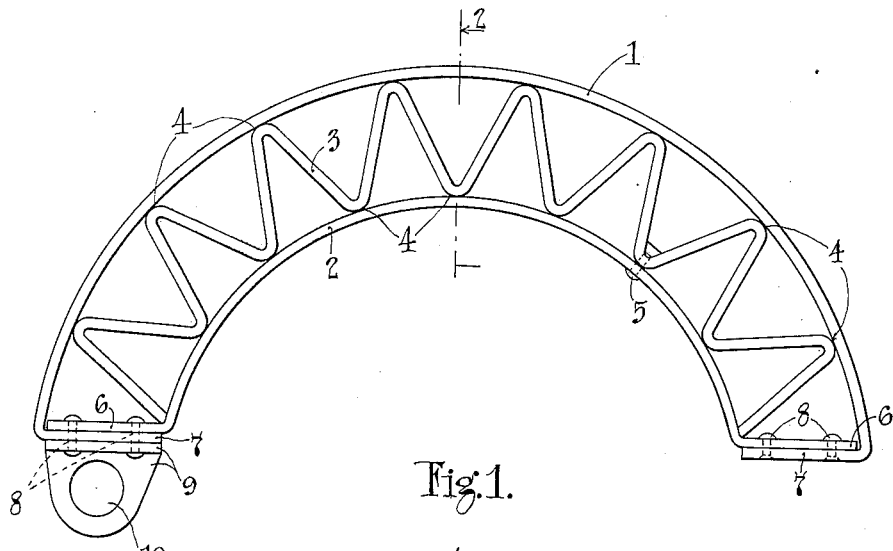
Figure 1 is a side elevation of the improved brake shoe.
Figure 2:
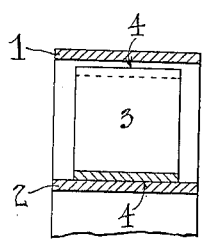
Figure 2 is a section on line 2—2 of Figure 1.

The illustrated form of the invention comprises an outer arcuate member 1, a concentric, inner, arcuate member 2, and a corrugated reinforcing member 3 which is bent to conform to the curvature of the members 1 and 2, as indicated in Figure 1. The member 3 is arranged between the members 1 and 2, and the bends of the member 3 are rigidly connected to the members 1 and 2 at 4 preferably by spot welding. Alternatively, this connection may be effected by means of rivets, as indicated on one of the bends at 5.

The end portions 6 and 7 of the members 1 and 2 are bent into engagement with each other and connected together by welding or by rivets 8.

A bracket or pivot member 9 may be connected to one end of the shoe, the construction of the bracket depending on the type of brake in which the shoe is to be used. In the illustrated form of the invention the bracket 9 has a hole 10 to receive a pivot bolt. The other end of the shoe may be designed to be engaged by a cam in the well known manner.

Friction material, not shown, may be mounted on the outer surface of member 1 in any known manner.

Figure 3:
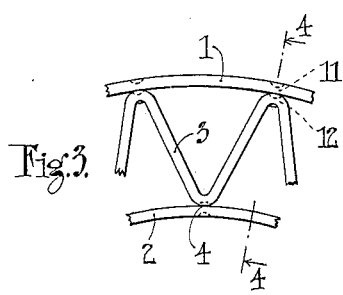
Figure 3 is a fragmentary side elevation of a modified form of the invention.
Figure 4:
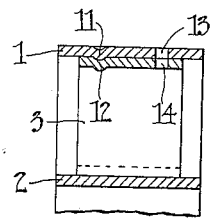
Figure 4 is a section on line 4—4 of Figure 3.
Figure 5:
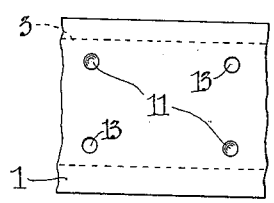
Figure 5 is a plan view of Figure 3.

In Figures 3, 4 and 5 the member 1 is provided with a staggered series of depressions 11 for engaging similar series of depressions 12 in the member 3 to facilitate the positioning of the member 1 on the member 3 preparatory to welding. Alternating with the depressions 11 and 2, holes 13 and 14 are provided in the members 1 and 3 respectively to receive brake lining rivets.

The invention is not limited to any particular number of corrugations 3 nor to any particular angular arrangement thereof.

The shoe is shown as being substantially semicircular, but it will be understood that the principle of the invention may be applied to shoes of any other size.

The improved shoe has increased mechanical strength on account of its trussed construction. The shoe dissipates heat more rapidly as it has a larger surface exposed to the air and therefore will not be appreciably distorted by heat generated during braking.

What I claim is:

1. A brake shoe comprising an arcuate outer member of strip metal, an inner member of strip metal, means for connecting the ends of said inner and outer members together, and a corrugated reinforcing member spacing said inner and outer members apart and having its bends connected thereto.

2. A brake shoe comprising an arcuate outer member and an arcuate inner member connected at their ends, and a corrugated reinforcing member between said inner and outer members and having its bends rigidly connected thereto.

3. A brake shoe as claimed in claim 2, wherein the ends of the inner and outer members are connected together and a bracket is connected to one of said ends.

4. A brake shoe as claimed in claim 2, wherein a staggered series of depressions is provided in the outer member engaging a similar series of depressions in the bends of the reinforcing member.

5. A brake shoe as claimed in claim 2, wherein a staggered series of depressions is provided in the outer member engaging a similar series of depressions in the bends of the reinforcing member, and wherein a staggered series of rivet holes is provided in the outer member and reinforcing member.

In testimony whereof I have affixed my signature.

ARTHUR D. POPE.